United States Patent [19]

Ouellette

[11] 4,351,692
[45] Sep. 28, 1982

[54] APPARATUS AND METHOD FOR AUTOMATICALLY FILLING AND HEAT WELD SEALING LENGTHS OF PLASTIC TUBING

[75] Inventor: Joseph F. Ouellette, Glendale, Mo.

[73] Assignee: Ouellette Machinery Systems, Fenton, Mo.

[21] Appl. No.: 223,117

[22] Filed: Jan. 7, 1981

[51] Int. Cl.³ .............................................. B31F 1/00
[52] U.S. Cl. .................................... 156/443; 156/153;
156/198; 156/227; 156/359; 156/368; 156/499;
53/268; 53/284; 53/373; 53/375; 53/379;
53/477; 53/482
[58] Field of Search ............... 156/198, 226, 227, 443,
156/499, 153; 53/266 R, 477, 482, 267, 268,
276, 283, 284, 373, 375, 378

[56] References Cited
U.S. PATENT DOCUMENTS

| | | | |
|---|---|---|---|
| 2,876,154 | 3/1959 | Usab | 156/153 |
| 2,926,474 | 3/1960 | Morrison et al. | 53/373 |
| 2,927,410 | 3/1960 | Doyen et al. | 53/268 |
| 2,982,074 | 5/1961 | Shiv | 53/276 X |
| 3,516,220 | 6/1970 | Buford et al. | 53/268 X |

*Primary Examiner*—David A. Simmons
*Attorney, Agent, or Firm*—Rogers, Eilers & Howell

[57] ABSTRACT

A machine for automatically sealing the end of various sized lengths of plastic tubing and for filling same has a clamshell clamp for straightening and firmly positioning the tubing, a carriage with an alignment ring which is lowered over the end of the tubing, a heat probe with a separate drive for insertion into the tube end to heat it, and a plurality of plows having depending guide legs which are simultaneously advanced radially inward against the heated tube end to collapse it and hold it as it cools, thereby creating a weld seal. An abrading arm assembly is mounted to the carriage and has an abrading brush or roller which may be rotated upon insertion into the tube end to roughen the inner surface of the tube end to enhance the weld seal. The tube straightener and the alignment ring positively align the pipe and the heat probe. A filler arm assembly is mounted to the carriage and may be extended to align with the tubing. A valve and cylinder in the filler arm automatically control the flow of the desired filler material into the tubing. The heat probe is of a modular construction with a quick release to facilitate its rapid removal and replacement for maintenance, or to change the operating temperature of the apparatus to suit tubing manufactured from different types of plastics. Controls are provided to time the various operations and are fully adjustable to adapt the apparatus for different applications.

18 Claims, 16 Drawing Figures

APPARATUS AND METHOD FOR AUTOMATICALLY FILLING AND HEAT WELD SEALING LENGTHS OF PLASTIC TUBING

BACKGROUND AND SUMMARY

Plastic tubing made of PVC TM or the like is widely used in many industries. Some of the uses of plastic tubing require it to be closed off or sealed at one or both ends. Raw tubing which is sealed at both ends can be a very inexpensive way to form a container for all sorts of materials in all sorts of applications. This is especially true if re-opening of the tube is not required, thereby permitting a permanent heat or weld seal to be used instead of a threaded end fitting, or the like.

One such application wherein heat or weld seals are well suited is in the manufacture of cylindrical elements for a heat sink as used in a solar energy furnace. These cylindrical elements are permanently sealed at both ends, with a suitable chemical, such as calcium chloride solution contained therein for absorbing and storing heat for later use. Depending on the capacity of the furnace, the heat sink might require a large number of cylinders of a similar size and length. As can be appreciated, this is an application which would be particularly suited to some type of automatic operation in making these cylinders out of raw plastic pipe.

In the prior art, sealing and filling these cylinders and other applications which have required closing off or sealing plastic tubes have been accomplished by hand using somewhat crude techniques. For example, a blow torch or the like may be used to heat and soften an end of a tube and a clamp may then be tightened down on the end of the tube to weld it and create a seal. As can be appreciated, there are many problems using this approach including ignition of the plastic tube or its contents, over-heating causing cracks and leaks in the areas adjacent the seal, injury to the operator caused by accidental contact with either the blow torch, the clamp, or the hot plastic tube, and the increased expense of any hand operation including high labor costs, wasted materials, and reliance on the skill of the worker in achieving satisfactory results.

To solve these and other problems, applicant has succeeded in designing and developing a machine and a method for automatically hot weld sealing the ends of raw thermoplastic tubing, such as that made of polyvinyl chloride or the like. For those applications requiring the tube to be filled with a fluid material, such as in the heat sink application, applicant's device also has the capability of automatically filling the tube once an end has been weld sealed. To enhance the weld seal formed automatically by the machine, it also has the capability of roughening or abrading the inner surface of the tube end which removes any film of oil or the like from the surface and also increases the bonding between the surfaces as it is weld sealed. With the prior art method of hand sealing, this abrading step is often neglected because of the increased time and expense involved to perform this extra step by hand.

Applicant's machine is automated, so that once an operator places a length of raw tubing into the machine and clamps it in place, the machine automatically takes over and abrades the inner surface of the tube end, lowers a heating head into the tube end to heat it from the inside out and, after the tube end has been heated sufficiently, retracts the heating head and then collapses the tube end by simultaneously actuating four air cylinders with plows and guide legs which converge radially inward against it. The plows are held sufficiently long to weld the collapsed tube end as it cools and the pressure of the plows ensures a solid weld between the sidewalls of the tube. At the end of the cycle, the tube may be removed from the machine, turned over, and placed back in the machine to automatically start the second half of the cycle. During the second half of the cycle, the tube is automatically filled by a fill arm before the second end is sealed by the same method. At the end of the second half of the cycle, a completed cylinder filled with the fluid material, such as calcium chloride solution, has been automatically formed and the machine is ready to accept another raw tube for processing.

Applicant's machine is designed to provide many advantages over the prior art. For example, the heating head assembly may be quickly disconnected and removed from the machine and a replacement assembly inserted to permit continuous operation should the heating head fail for any reason. While it is not expected that replacement of the heating head assembly due to failure would be required very often, this one component is virtually the only component expected to fail because of the heat rods contained therein. Furthermore, it is often desirable to change the temperature to accommodate tubing made of different plastic materials. With this design, applicant's machine is readily changed over to provide this different operating temperature.

Applicant's machine also provides other advantages and features including adjustability for different height tubing, separate bottom plates to positively receive and hold either a raw or sealed end, fully adjustable timed heating, filling, and welding by the plow assembly, alternately measuring the fill by sensing the weight of the tube, pressurized air cooling of the heating head assembly with improved insulated mounting to avoid heat transfer from the head to the rest of the machine, a free floating stripping plate to ensure reliable retraction of the heating head from the heated tube, a guide ring to center the carriage assembly on the tube end and a tube straightener and holder to prevent misalignment of the tube, and full adjustability of the operating parameters of the machine to provide for changeover as is necessary to process tubing made of different plastics or of different sizes and lengths. These and other advantages of applicant's device are more fully explained in the drawings and description of the preferred embodiment which follows.

DETAILED DESCRIPTION OF THE PREFERRED EMBODIMENT

Applicant's automatic tube filling and sealing machine 20 includes generally a tubular frame 22 which supports a movable carriage assembly 24 having various sub-assemblies mounted thereon for the preparation, filling and sealing of the tube 25. These various sub-assemblies will be generally described first in connection with a brief overview of machine operation, as an aid in understanding. A plow assembly 26 is mounted on the underneath side of the carriage assembly 24 and collapses the tube end 27 during the sealing process. A heating head assembly 28 is mounted to the upper side of the carriage assembly 24 and may be extended through the carriage assembly 24 and into a tube end 27 to heat it before it is welded. An abrading arm assembly 30 is mounted on the carriage assembly 24 and can be extended inwardly over the tube 25 for insertion therein and operated to roughen up or abrade the interior surface of the tube end 27 to improve the weld formed between said collapsed interior surfaces. A filler arm assembly 32 is mounted at the opposite side of the carriage assembly 24 and may also be extended inwardly to align with the tube 25 to fill it with any suitable filler, as desired.

An adjustable tube support 34 is secured to a frame member 36 and supports the lower end of the tube 25 during the sealing or filling process. A tube straightener and clamp 38 straightens and aligns the tube 25 with the carriage assembly 24 and holds the medial portion of the tube 25 in position during operation of the machine as well. The carriage assembly 24 has several wheel assemblies 40 which ride along a frame member 42 while carriage side panels 44 and cross members 46 ride along a rear frame member 48 as the carriage assembly 24 is driven up and down the frame 22 by cylinder 50.

A control panel 52 is mounted to tubular frame 22 and has various control components 54 to adjust the various parameters of operation, as explained more fully hereinafter. Applicant's tube sealing machine 20 includes the necessary controls for fully automatic operation in that mere placement of a tube 25 into the tube clamp 38 will begin a timed sequence of operation which will either fill and seal or only seal, depending upon the desired sequence or mode selected. It is to be understood that the necessary components to provide this operation are included in control panel 52 as would be apparent to one of ordinary skill in the art.

Figure 2:
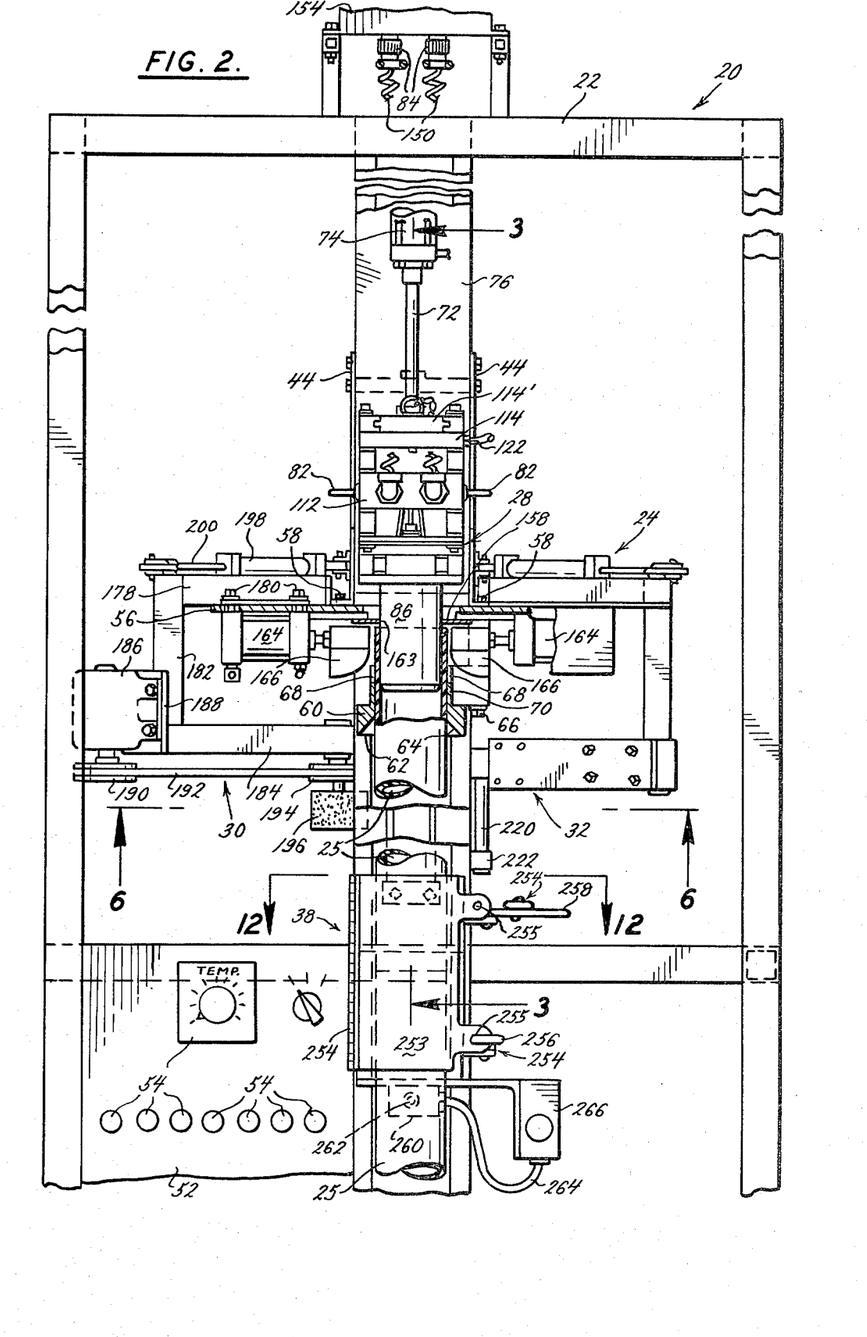
FIG. 2 is a partial front view, broken away and in cross-section to detail the carriage and plow.
Figure 3:
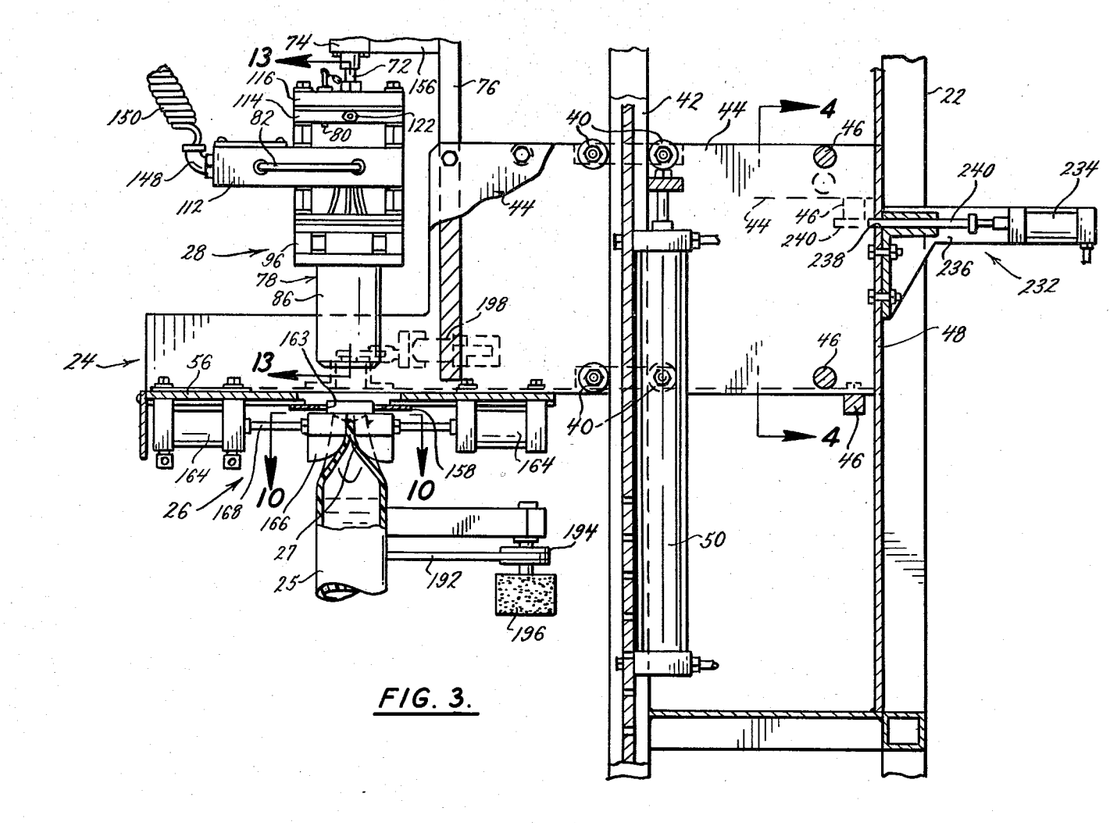
FIG. 3 is a cross-sectional view taken along the plane of line 3—3 in FIG. 2 to further detail the carriage and the drive mechanism therefor.

The various assemblies associated with the carriage assembly 24 are shown in greater detail in FIGS. 2 and 3 and their various components will now be more fully described. The carriage assembly 24 has a horizontally disposed platform 56 bolted to side panels 44 by bolts 58. A tube end alignment ring 60 has an opening 62 somewhat larger than the diameter of the tube 25 with a tapered inner surface 64 to help guide the tube end 27 into the alignment ring 60 as carriage assembly 24 extends down to contact and work on tube end 27. The alignment ring 60 is mounted in a spaced apart relationship with horizontal platform 56 by post and bolt assemblies 66. Grooves 68 are provided through the side wall 70 of alignment ring 60 and act as guides for the plow assembly 26, as will be explained more fully hereinafter.

Figures 1, 4, 5:
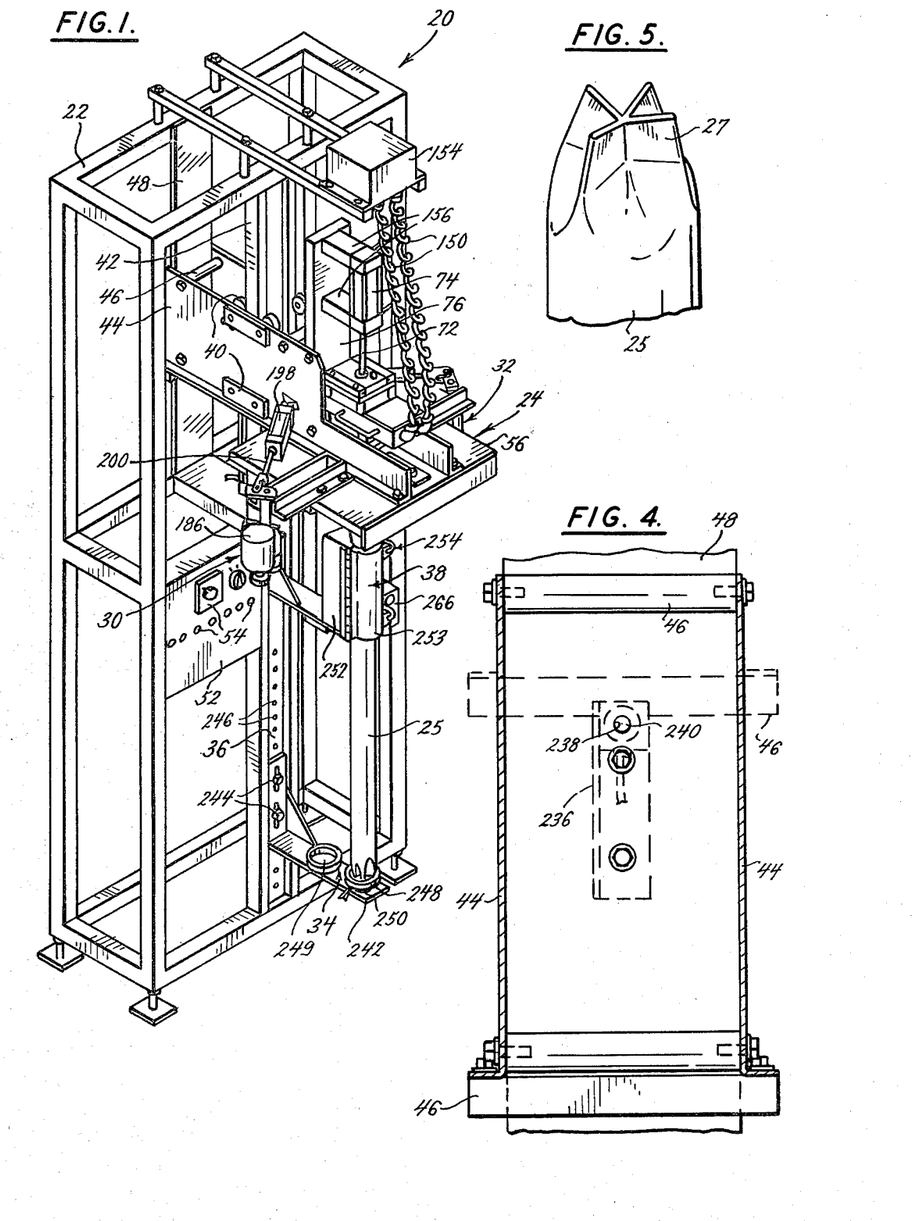
FIG. 1 is a perspective view of applicant's tube sealing machine.
FIG. 4 is a cross-sectional view taken along the plane of line 4—4 in FIG. 3 and detailing the stop for the carriage.
FIG. 5 is a perspective view of a tube end sealed by applicant's machine.
Figures 13, 14, 15, 16:
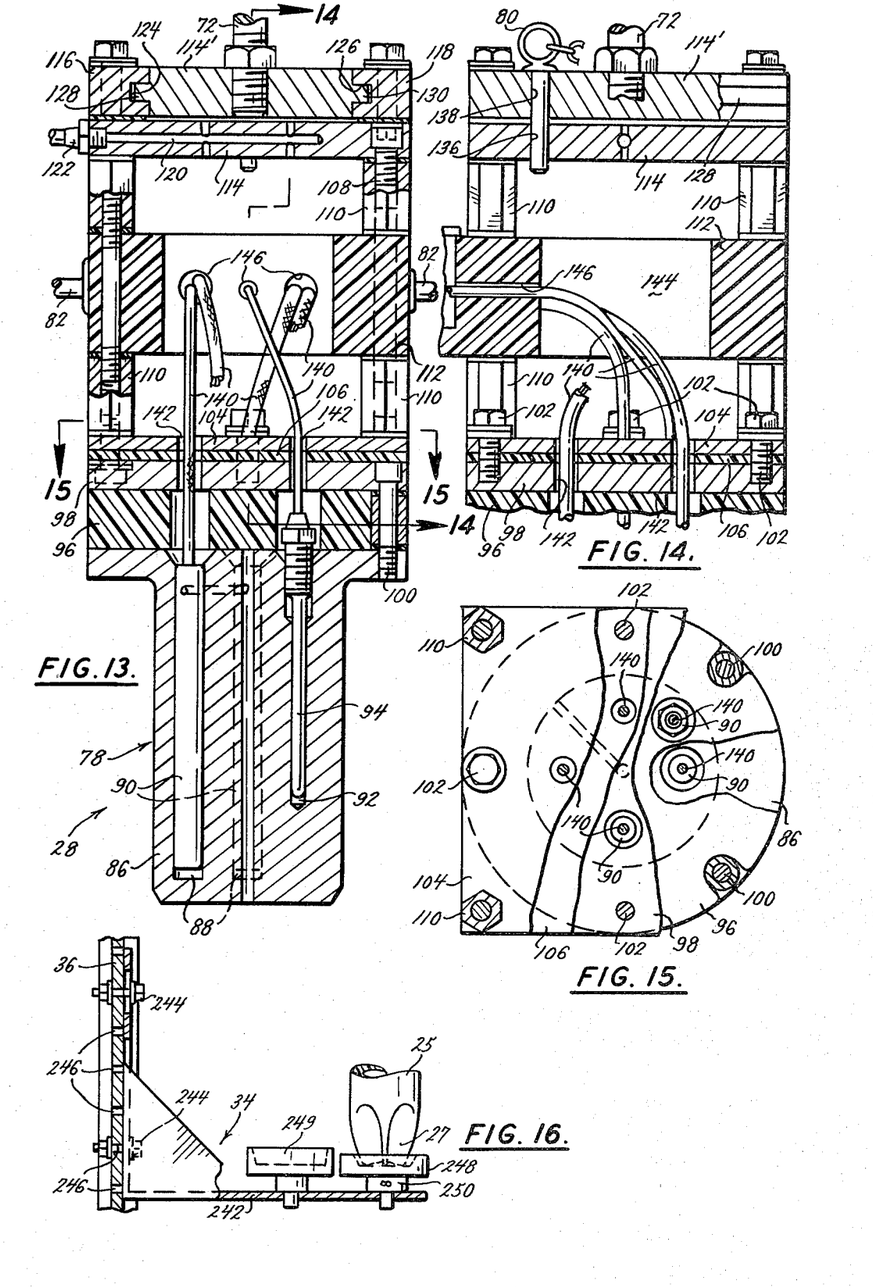
FIG. 13 is a cross-sectional view taken along the plane of line 13—13 in FIG. 3 and detailing the heating head.
FIG. 14 is a cross-sectional view taken along the plane of line 14—14 in FIG. 13 which further details the supporting structure of the heating head.
FIG. 15 is a cross-sectional view taken along the plane of line 15—15 in FIG. 13 and partially broken away to detail the mounting arrangement for the heating head on its support.
FIG. 16 is a partial cross-sectional view of the lower end of the tube support.

The heating head assembly 28 is shown assembled to the tube sealing machine 20 in FIGS. 2 and 3, and in greater detail in FIGS. 13, 14 and 15. The heating head assembly 28 is generally supported by the piston 72 extending downwardly from a drive cylinder 74 which is used to extend and retract the heating head assembly 28 into and out of the tube end 27 through carriage 24. The drive cylinder 74 is mounted to a support plate 76 which is in turn bolted to side panels 44 of carriage assembly 24. This is best shown in FIGS. 1 and 3. The heating head assembly 28 includes a heat module 78 which may be slidably removed from the assembly by removing cotter pin 80, as best shown in FIG. 14. Electrical connectors 84 are of the quick disconnect variety to facilitate the removal of heat module 78 from the heating head assembly 28. Thus, by removing cotter pin 80, disconnecting electrical connectors 84, grasping handles 82 and sliding the heat module 78 towards the front of the machine, the heat module 78 may be removed when drive cylinder 74 is in its retracted position.

The heat module 78 includes more particularly a heat probe 86 which has a plurality of drilled cylindrical openings 88 for the insertion of rod-like heating elements 90 and a somewhat smaller cylindrical opening 92 for a thermocouple 94 to sense the temperature of the heat probe 86, as is known in the art. An insulating plate 96 separates a probe mounting plate 98 from the heat probe 86 and is mounted thereto by bolts 100. A second set of bolts 102 mount the probe mounting plate 98 to a second mounting plate 104 with a second layer of insulation 106 therebetween. A third set of elongated bolts 108 and studs 110 mount the heat probe 86 and plates 98, 104 to a junction box 112, a base plate 114, and two edge plates 116, 118. An air channel 120 is provided in base plate 114 with an air fitting 122 at the side thereof for connection to a source of high pressure air supply. Edge plates 116, 118 have grooves 124, 126 respectively which slidably engage the tongues 128, 130 of drive plate 114. Edge plates 116, 118 are secured in position by cotter pin 80 which slips into bores 136, 138 in drive plate 114 and base plate 114, respectively.

As can be seen from FIGS. 3, 13 and 14, electrical wires 140 extend upwardly from the rod heat elements 90 and thermocouple 94, through openings 142, and into the central area 144 of junction box 112. A channel 146 is formed in the junction box 112 and the wires 140 pass therethrough and terminate in electrical connectors 148. Spiral-type flexible cables 150 extend upwardly from electrical connectors 148 and terminate in a second set of electrical connectors 84 which, as previously mentioned, are of the quick release type. Connectors 84 are mounted to a second junction box 154 near the top of the machine.

The drive plate 114 is screwed onto the piston arm 72 of drive cylinder 74. Drive cylinder 74 is mounted to an upright support plate 76 extending between side panels 44 by mounting blocks 156. Thus, drive cylinder 74 may extend and retract the heating head assembly 28 into and out of the tube end alignment ring 60 for selective application of heat to the tube end 27 being sealed. Also, the heating head assembly 28 may be quickly and easily changed to accommodate repair, maintenance, or to change the heat range of the unit by simply removing cotter pin 80, disconnecting electrical connectors 84, and sliding the heat module 78 forwardly until grooves 124, 126 clear the forward end of tongues 128, 130.

Figures 6, 7, 8:
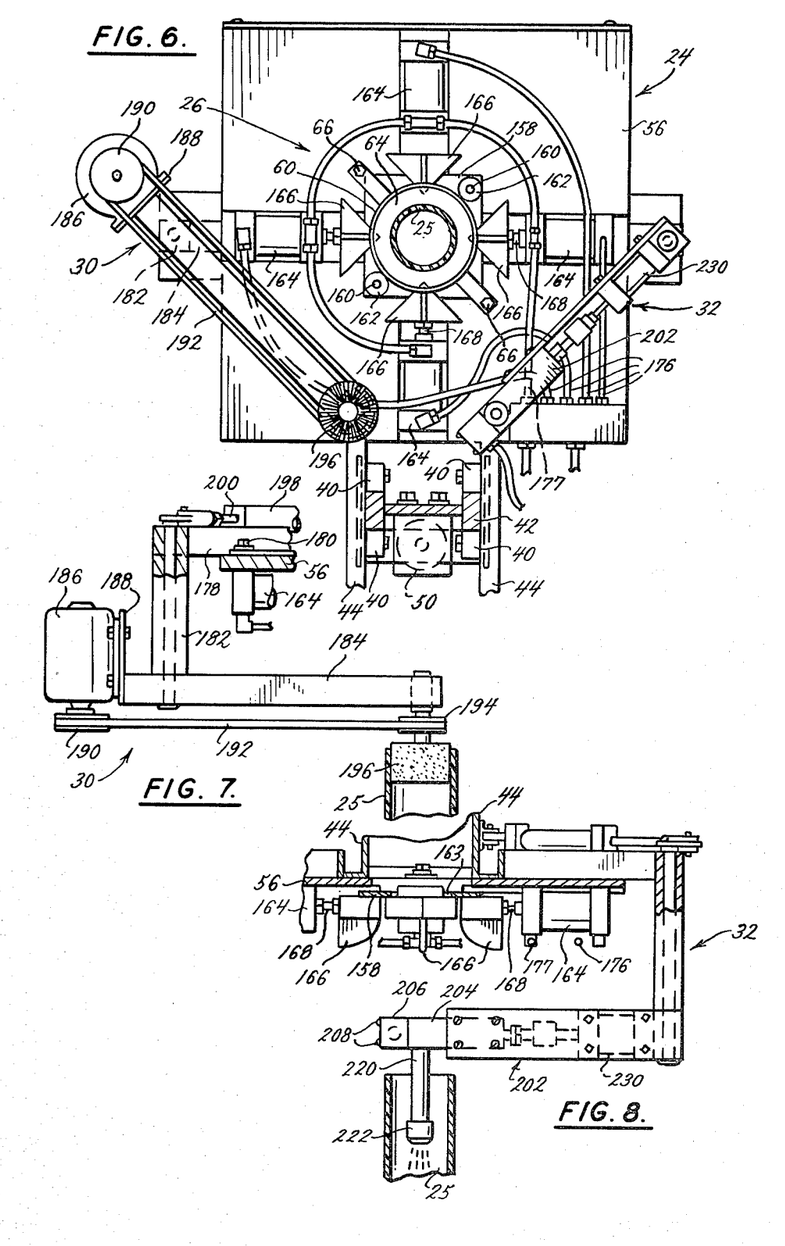
FIG. 6 is a view taken along the plane of line 6—6 in FIG. 2 and detailing the underneath side of the carriage with the fill arm and abrading arm.
FIG. 7 is a front view broken away to further detail the abrading arm as it is inserted in a tube end.
FIG. 8 is a front view broken away to further detail the fill arm as it is inserted in a tube end.

As best shown in FIG. 6, a stripper plate 158 is secured to the underneath side of carriage 24 by bolts 160 and washers 162. Stripper plate 158 has a center hole 163 which is sized just larger than heat probe 86, yet smaller than the outside diameter of tube 25 and loosely mounted so that heat probe 86 may feel its way down through stripper plate 158 and into tube end 27. However, after tube end 27 has been heated, there might be a tendency for it to adhere to heat probe 86 and be lifted by it as it is retracted. Stripper plate 158 acts to "strip" the tube 25 off the heat probe 86 and coacts with tube straightener and clamp 38 to hold it in place for the collapsing action of the plow assembly 26. Stripper plate 158 also permits a much faster withdrawal of heat probe 86 as is desirable to minimize cooling of tube end 27 between the heating and welding cycles.

Figures 9, 10, 11, 12:
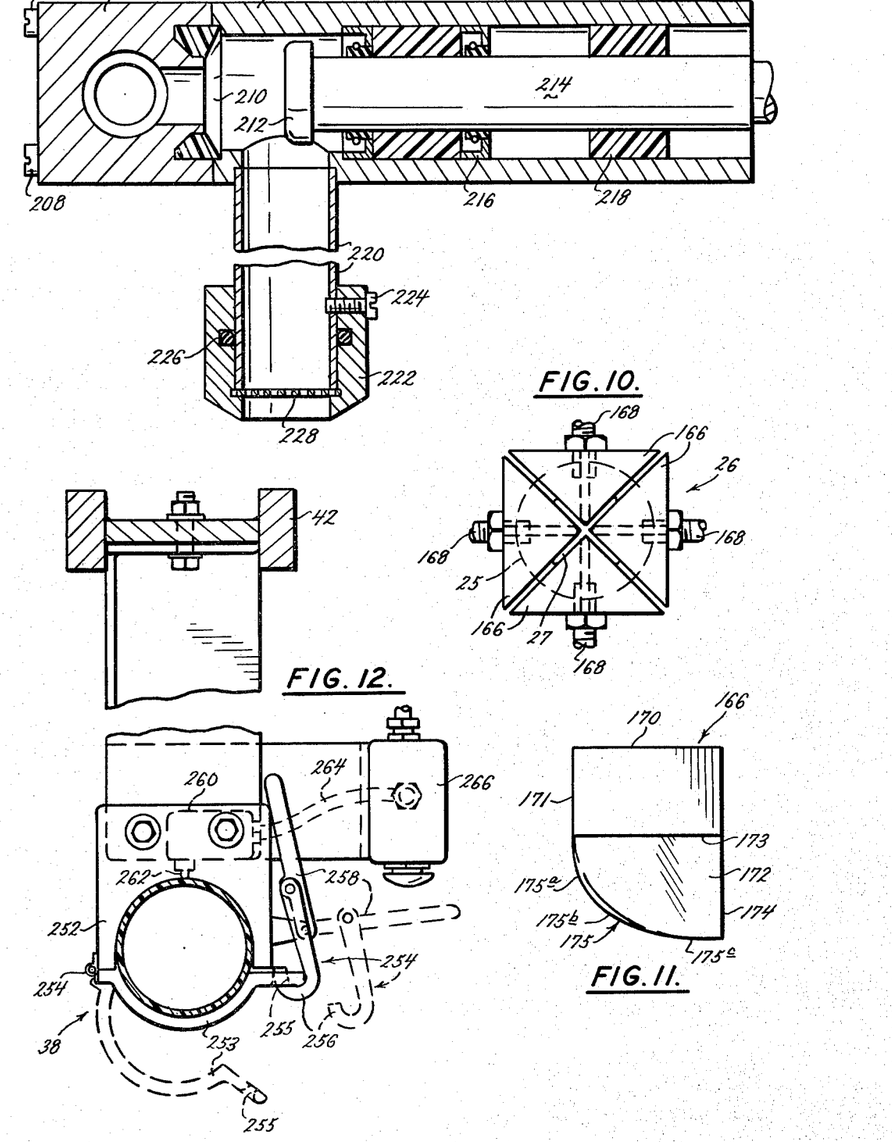
FIG. 9 is a cross-sectional view of the head of the fill arm and its operating mechanism.
FIG. 10 is a view taken along the plane of line 10—10 in FIG. 3 and further detailing the plow assembly.
FIG. 11 is a side view of a ram and guide leg used in the plow assembly.
FIG. 12 is a view taken along the plane of line 12—12 in FIG. 2 and detailing the tube straightener clamp and automatic operation switch.

The plow assembly 26 is best shown in FIGS. 6, 10 and 11, and in cross-section in FIGS. 2 and 3. Plow assembly 26 is mounted to the underneath side of the horizontal platform 56 and includes four drive cylinders 164 each having a ram 166 mounted at the end of its piston arm 168. The ram 166 is shown in FIG. 11 and has an upper nose portion 170, formed in an approximate 90° angle as shown in FIGS. 7 and 10. The nose portion 170 terminates in a point 171. The nose portion 170 has a depending guide leg 172, as shown in FIG. 11. The guide leg 172 depends from nose portion 170, beneath the point 171, and extends to the rear, bisecting the bottom surface of nose portion 170 as shown in FIG. 6. Guide leg 172 is a thin plate, e.g. ¼" roughly in the shape of a pie section, having two straight sides 173, 174, and a curved side 175. Side 175 is preferably a compound curve having a first portion 175a characterized by a first radius of curvature adjoining point 171, a medial portion 175b characterized by a second radius of curvature smaller than the radius of curvature of portion 175a, and a terminal portion 175c characterized by a radius of curvature larger than the radius of curvature of portion 175b. The leading edge of portions 175a, b, which contacts the tube end as it is collapsed, is shaped at approximately 90° to blend with point 171. At the juncture between portions 175b and 175c, the edge changes, in a smooth transition, from 90° to a flat edge. Portions 175a, 175b, and 175c each occupy about one third of the length of side 175, though some variation in length of each portion may be made. The side 175 is shaped to have smooth arcuate transitions between portions 175a, 175b and 175c. Guide leg 172, and nose 170 of ram 166, are dimensioned to provide a smooth fold and seal of tube end 27. For example, the nose 170 will typically be shaped as a right angle isosceles triangle approaching three inches on a side for sealing standard three inch tubing. Guide leg 172 will typically have a side 174 of about three inches in length for sealing standard three inch tubing. As best shown in FIG. 10, the four rams 166 are simultaneously advanced inwardly by the drive cylinders 164 and collapse the tube end 27 therebetween to create the seal. The drive cylinders 164 are controlled by air lines 176, 177.

The abrading arm assembly 30 is shown in FIG. 7 and is supported by mounting bracket 178 secured to the horizontal platform 56 by bolts 180. A downwardly depending support arm 182 is pivotally mounted to the end of mounting bracket 178 and supports swing arm 184. A drive motor 186 is mounted by bracket 188 and has a pulley 190 with drive belt 192 driving a second pulley 194 mounted at the outboard end of swing arm 184. A wire brush 196 is mounted to a common shaft with pulley 194 so that operation of drive motor 186 drives wire brush 196. Swing arm 184 is extended and retracted from a position immediately above the center of the tube by cylinder 198. The drive arm 200 of cylinder 198 is pivotally mounted to the top of support 182 and the cylinder 198 is mounted to the outer surface of a side panel 44. This is best shown in FIGS. 1 and 7.

The filler arm assembly 32 is best shown in FIG. 8 and is extended and retracted similarly to the abrading arm assembly 30, as will be understood by one of ordinary skill in the art. The filler arm assembly 32 includes a fill head 202 shown in cross-sectional detail in FIG. 9. Fill head 202 includes a fill chamber 204 with a supply head 206 bolted to its end by bolts 208. Supply head 206 has a valve seat 210 which receives valve head 212 mounted at an end of operating cylinder 214. Operating cylinder 214 is slidably mounted in fill chamber 204 by sealing member 216 and support 218. A downwardly depending fill tube 220 is mounted at the end of fill chamber 204 and has an end fitting 222 attached to fill tube 220 by screw 224. End fitting 222 has a seal 226 and supports a wire mesh screen 228. Operating cylinder 214 is extended and retracted by air cylinder 230, as is best shown in FIGS. 6 and 8.

The carriage assembly 24 is moved up and down by drive cylinder 50 from a fully retracted to a fully extended position as is necessary for sealing the end of the tube 25. In addition, an intermediate position is necessary for operation of the abrading arm assembly 30 and filler arm assembly 32, as will be explained in the operation section. This intermediate position is defined by a stop 232 shown in FIGS. 3 and 4 which includes an air cylinder 234 mounted to the tubular frame 22 by a supporting bracket and cylinder guide 236. A hole 238 is formed in rear frame member 48 to permit extension of stop bar 240 into the carriage area. As shown by phantom lines in FIG. 3, the stop bar 240 is extended inwardly to catch and support cross member 46 and achieve the intermediate position.

The tube 25 itself is supported by tube support 34, best shown in FIG. 16, which includes a lower tube bracket 242 bolted to front frame member 36 with bolts 244. A plurality of mounting holes 246 are provided for adjustment of the position of lower tube bracket 242 to accommodate different lengths of tubing, as desired. Two end cups 248, 249 are shown and may be exchanged, one for the other, as each is designed to support either an unsealed or sealed tube end 27. The end cup 248 for the sealed tube end has a pressure transducer 250 to sense the weight of the tube and its contents and provide a means for controlling the amount of material put into the tube 25 before its other end is sealed.

The tube straightener and alignment clamp 38 is best shown in FIG. 12. Clamp 38 includes a semi-cylindrical receiving block 252 and a mating semi-cylindrical closure 253. Closure 253 is joined to the outside edge of the block 252 by piano hinge 254. The closure 253 has a set of catches 254 having holes 255 for receiving hooks 256. Hooks 256 may be driven by manual toggle levers 258 or by air cylinders, if preferred. Air cylinders, such as cylinders 164, may be driven to retract hooks 256 and close closure 254 against receiving block 252 in a clamshell fashion. A push button type limit switch 260 is mounted adjacent to the tube clamp 38 with its push button operator 262 aligned with the semi-cylindrical receiving block 252 such that when the tube is inserted and held in position by closure 253, the push button operator 262 is depressed to operate the limit switch 260. An electrical cable 264 connects the limit switch 260 to a start/stop station 266 so that inserting the tube into the tube straightener and clamp 38 performs the same function as pushing the start button at the start/stop station 266.

OPERATION

Applicant's tube filling and sealing machine automatically processes a raw length of plastic pipe or tubing into a container for a chemical such as calcium chloride or the like having both ends heat sealed by welding. An operator need only place the tubing into the tube clamp to have the top end of the tube sealed. After the top end of the tube is sealed, the operator need only remove the tube, exchange the bottom tube cups, and reinsert the tube into the tube clamp. The machine then will automatically fill the tube with the desired chemical to the desired amount and seal the other end of the tube.

The machine and its controls are fully adjustable to provide for different lengths and diameters of tubing, as well as tubing made of different types of plastic which require different heating temperatures, heating times, and welding times to ensure a proper seal is formed. In one mode, the machine will automatically cycle as described above using conventional automation hardware, and logic, alternately filling the tube after one of its ends has been sealed. In another mode of operation, the machine will only seal the ends of the tube and the filling function will be eliminated from the cycle. The machine may also be manually controlled.

To accomplish a seal, a tube is placed in the tube clamp with its bottom end supported by the tube cup which automatically straightens and aligns the top end of the tube with the tube alignment ring mounted on the carriage assembly, as well as the heating head assembly. The push button switch in the tube clamp automatically starts a cycle which includes the following fundamental operations. As is best shown in FIGS. 1 and 2, the tube straightener has sufficient height to enclose a goodly portion of tube and force it into a strictly straight orientation. As is well known in the art, construction grade plastic pipe is not generally straightened and sections thereof would otherwise not work in applicant's machine. Straightened pipe is available only at increased cost and may even then warp during storage. The clamshell type tube straightener and clamp significantly eliminates this problem for all but the most severely warped pipe sections.

At the start of the cycle, the carriage assembly is at its uppermost position with the heating head assembly being retracted above the horizontal platform of the carriage assembly. Both the abrading arm assembly and the filling arm assembly are retracted out of line with the tube, as is shown in FIG. 6. After the tube is placed in the tube clamp, actuating the push button limit switch, the abrading arm is extended into line with the tube and the carriage assembly is moved downwardly to the intermediate position as defined by the carriage stop which positions the abrading wheel or brush in the end of the tube where it contacts the inner surface thereof. The abrading wheel is then powered by the drive motor and pulley to roughen up the inner surface of the tube. This is timed and at the completion of its cycle, the carriage assembly is lifted back to its start position, thereby removing the abrading wheel from the tube and, after having cleared the tube, the abrading arm is returned to its home position.

The carriage assembly is next lowered until the alignment ring reaches the tube end and the heating head assembly is then lowered through the horizontal mounting plate of the carriage assembly, the stripper plate, and into the end of the tube. This position is shown in FIG. 2. The heating rods in the heat probe are then turned on to heat up the heat probe and transfer the heat to the tube end which is held in place by the tube alignment ring and clamp. The thermocouple in the heat probe senses the temperature of the probe and the control monitors the operation of the heating rods to avoid over-heating the heat probe or the end of the tube. A temperature setting control is provided on the control panel and operates in conjunction with the thermocouple to provide adjustability in the temperature setting of the heat probe.

At the end of the timed cycle, the heating head assembly is retracted by its drive cylinder up through the stripper plate and horizontal platform of the carriage assembly and to its home position. After the heating probe clears the horizontal platform and stripping plate, the plow assembly is actuated and the air cylinders drive their respective rams radially inward against the heated tube end to collapse and hold it in a collapsed condition as the tube end cools into a sealed configuration. As explained in the specification, the alignment ring has grooves and each plow has a guide which rides along the groove to maintain the rams in proper orientation and avoid over-travel or misalignment which could adversely affect the seal.

As the plows are advanced against the heated tube end, their triangularly shaped noses and depending guide legs contact it first along their leading 90° edge which ensures that a fold is formed at the contact points, equidistant about the circumference thereof (or nearly so). The guide legs form smooth, arcuate indentations below the weld and before the noses "clamp" the tube end to lessen the possibility of forming weak spots due to stretching or buckling of the heated plastic. The actual weld is formed under pressure between the noses of the rams which minimizes any possibility of holes or discontinuities remaining. Thus, the tube end is abraded, heated, and then forcefully collapsed by four air driven rams and held as it cools to ensure the formation of a positive seal. At the end of a timed sealing or welding period, the air cylinders retract the rams from the tube end and the carriage assembly is lifted back to its home position to ready itself for another cycle.

In those cycles where filling of the tube is also desired, the filler arm is extended and retracted much as the abrading arm assembly and its cycle may be performed either before or after the abrading step. As with the abrading step, the carriage assembly is lowered to the intermediate position as the filler head is extended inwardly to line up with the tube. In this position, as shown in FIG. 8, the filler assembly extends downwardly into the tube to prevent loss of filler material and the tube is filled automatically by either timing the filling cycle or measuring the weight of the tube and shutting off the filler arm in response to the accumulated weight of the tube and material. At the end of the filling cycle, the carriage is lifted back to its home position and the filler arm is retracted to its home position before the machine continues on with the heating or abrading step, as appropriate.

When applicant's machine is used to create cylinders filled with material and sealed at both ends, then the machine may be set to automatically fill during every other cycle. This would provide fully automatic operation and an operator would need only remove and replace the tube and exchange the tube support cups to continuously turn out completed cylinders.

Varous changes and modifications would be apparent to one of ordinary skill in the art upon reading applicant's disclosure. These changes and modifications are included within the teaching of applicant's invention and he intends that his invention be limited only by the scope of the claims appended hereto.

I claim:

1. A device for sealing an end of a tube comprising means to hold, straighten, and align the tube during the sealing operation, means to abrade the inner surface of the tube end including an arm and a driven rotatable brush mounted thereon with means to selectively position the brush inside the tube end, means to heat the end of the tube being sealed, and means to fold, collapse, and squeeze said heated tube end as it cools, thereby sealing said tube end.

2. The device of claim 1 further comprising means to automatically start the sealing operation as the tube is placed in the holding means.

3. The device of claim 1 further comprising means to fill the tube before said tube end is sealed.

4. The device of claim 1 wherein the heating means is mounted on a carriage, and further comprising means to move said heating means with respect to said carriage.

5. The device of claim 4 further comprising a guide for receiving a tube end and holding it in position as the heating means is inserted and removed therefrom.

6. The device of claim 4 wherein said plow means is mounted on said carriage, said plow means including a plurality of rams and means to simultaneously advance said rams radially inwardly against the tube end and thereby collapse and seal same.

7. The device of claim 1 wherein said plow means includes a plurality of rams and further comprising means to simultaneously advance said rams radially inwardly against the tube and thereby collapse and seal same.

8. The device of claims 6 or 7 further comprising means to guide said rams as they are advanced.

9. The device of claim 3 wherein the filling means includes a filler arm with means to selectively position said arm over said tube.

10. A device for sealing an end of a tube comprising a clamping means to enclose a portion of the length of the tube to hold, straighten and align said tube during the sealing operation, means to abrade the inner surface of the tube end including an arm with a driven rotatable brush mounted on said arm and means to extend and retract said arm from a position centered over said tube, a carriage, ring means on said carriage to encircle the tube end during the sealing operation, means to extend and retract said carriage from a position wherein said ring means encircles said tube end, a heating element disposed on said carriage with means to move said heating element into contact with the inner surface of said tube end, and plow means including a plurality of rams, each of said rams having a nose and a guide leg depending therefrom, and means to advance said rams radially inwardly to collapse and squeeze said tube end between the nose portions of said rams as it cools, thereby sealing same.

11. The device of claim 10 further comprising means to fill said tube before sealing including a fill arm with an opening at the end of said arm for injecting a fill material into said tube and means to extend and retract said arm from a position centered over said tube.

12. The device of claim 11 further comprising means to control the amount of fill material injected into said tube.

13. The device of claim 10 further comprising a stripping plate to aid in the removal of the heating element from said tube end after said tube end has been heated.

14. The device of claim 10 wherein the heating element includes a cylindrical probe with a plurality of heating rods disposed therein to supply heat to said probe, a thermocouple to sense the temperature of said probe and means to control the heating rods in response thereto.

15. The device of claim 14 further comprising means to circulate air around said heating element.

16. The device of claim 10 wherein each guide leg has an arcuate edge, said edge being that which contacts the heated tube end to fold and collapse same.

17. The device of claim 16 wherein said arcuate edge has a leading edge formed to an angle of approximately 90°.

18. The device of claim 16 wherein said arcuate edge has a compound curvilinear shape.

* * * * *